INVENTOR.
WILLIAM F. BARTLETT
BY George J. Seligsohn
ATTORNEY

Aug. 1, 1967 W. F. BARTLETT 3,334,331

COMMON SERIES DOUBLE COMPARISON CIRCUIT FOR A TIME DIVISION MULTIPLEX SYSTEM

Filed June 9, 1964 2 Sheets-Sheet 2

3,334,331
Patented Aug. 1, 1967

3,334,331

COMMON SERIES DOUBLE COMPARISON CIRCUIT FOR A TIME DIVISION MULTIPLEX SYSTEM

William F. Bartlett, Rochester, N.Y., assignor, by mesne assignments, to Stromberg-Carlson Corporation, Rochester, N.Y., a corporation of Delaware Filed June 9, 1964, Ser. No. 373,626
8 Claims. (Cl. 340—146.2)

Figure 1:
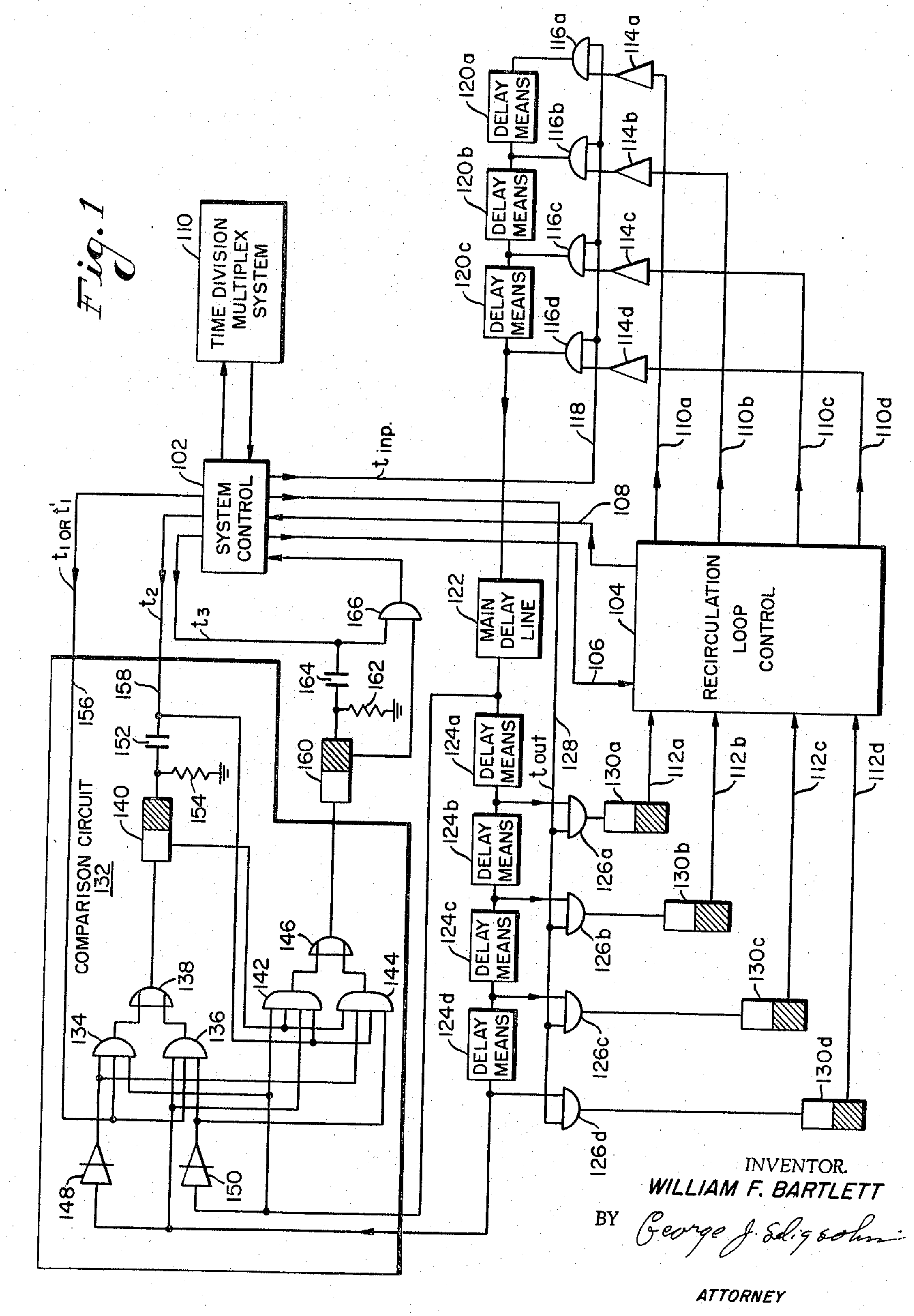

This invention relates to a double comparison circuit for a time division multiplex system and, more particularly, to a common series double comparison circuit therefor.

In a time division multiplex system, it is often necessary to compare a predetermined multibit alphanumeric character with both first and second other multibit alphanumeric characters or with each of a first series of different multibit alphanumeric characters and each of a second series of different multibit alphanumeric characters.

For instance, in a time division multiplex telephone system, it is necessary to sample each line in succession to determine whether the line being sampled manifests a newly calling condition, i.e., a line which is in an off-hook condition, but has not received any service. It is the practice in time division multiplex systems to provide a calling line store, which may be of the recirculating delay line type, for storing therein the designation of each calling line that has already received service within that particular time slot of a repetitive time frame which has been assigned to that calling line. Similarly, a called line store is provided, which also may be of the recirculating delay line type, for storing therein the designation of each called line within the particular time slot of a repetitive time frame which has been assigned to that called line. Since any line whose designation is stored in either the calling line store or the called line store is already in service and therefore cannot be the line of a newly calling party, for the sake of efficiency, it is desirable to eliminate such lines from a test to determine whether or not the line is off-hook or on-hook. In order to accomplish this, it is necessary to compare the designations of a predetermined line with the respective designation of each of the lines stored in the calling line store and with the designation of each of the lines stored in the called line store to determine whether the designation of the predetermined line is included among those designations stored in either the calling or called line stores. If such a comparison shows that the designation of the predetermined line is not included, a test is then made to determine whether the predetermined line is off-hook or on-hook. However, if the comparison shows that the designation of the predetermined line is included, no such test is made, but, instead, the predetermined number is changed and, in a similar manner to that above described, a comparison with the new predetermined number takes place.

Another instance in a time division multiplex telephone system where such a comparison is necessary is in the determination of whether or not a line being called is already busy or whether it is free and can be rung. In this case, it is necessary to compare the designation of the line being called with each of the designations stored in the calling and called line stores.

Storage of information in a time division multiplex system may be either in parallel form or in serial form. In parallel form, each character occurs successively in a different time slot, but the individual bits of any given multibit character occur simultaneously on that respective one of separate conductors which corresponds to that bit. In serial form, not only does each character occur successively in a different time slot, but each time slot is broken up into successive sub-slots, each sub-slot accommodating a different individual bit of the character.

Storage in parallel binary form necessitates a separate individual delay element for each bit of a multibit character, which is a disadvantage. However, it directly provides an entire stored character at its output, which is an advantage. Storage in series form, on the other hand, permits the use of a single delay element, which is an advantage, but necessitates the use of means, such as a tapped delay line, for converting a stored character from series to parallel form for use. As the number of bits in a character becomes greater, storage in series form, rather than in parallel form, makes the equipment saving feature thereof more and more advantageous.

Regardless of the fact of whether storage takes place in serial form or in parallel form, where it has been necessary to compare one character with another or one character with each of a plurality of others, it has been the practice to provide an individual comparison circuit for comparing each corresponding pair of individual bits of any two characters to be compared. It will be seen that as the number of bits per character becomes greater, the number of comparison circuits needed increases proportionately. Further, a double comparison requires double the number of comparison circuits.

The present invention is directed to a reduction to a single one in the number of individual comparison circuits needed to provide the double comparison of a predetermined multidigit character with each of two other characters, which characters appear in serial form. The comparison circuitry utilized by the present invention is completely independent of the number of bits composing a character. Therefore, the savings in equipment realized by the present invention increase in direct proportion with the number of bits composing a character.

It is, therefore, an object of the present invention to provide a common series double comparison circuit for use with a single stream of serial coded character manifesting bits.

Figure 2:
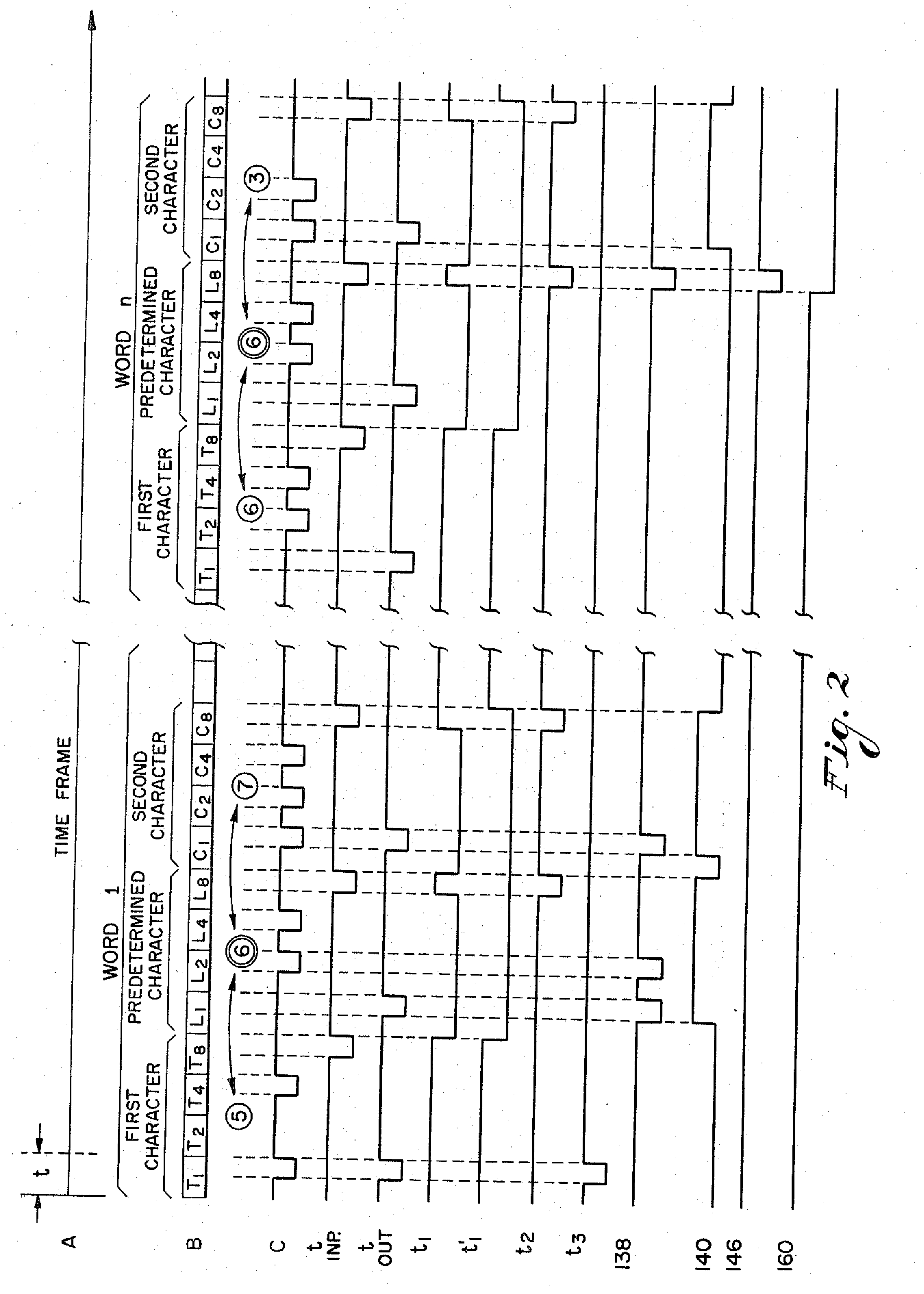

This and other objects, features and advantages of the present invention will become more apparent from the following detailed description taken together with the accompanying drawings, in which:

FIG. 1 is a block diagram of a time division multiplex system incorporating a preferred embodiment of the comparison circuit forming the present invention; and FIG. 2 is a timing chart helpful in understanding the operation of the present invention.

Referring now to FIG. 1, there is shown time division multiplex system 100, which may be a telephone system, for instance, which supplies various information, such as whether a telephone is on-hook or off-hook, to system control 102 and is thereafter controlled by system control 102. Since the details of time division multiplex system 100 have nothing to do with this invention, it will not be further discussed. However, system control 102 includes, among other things, a clock pulse generator, one or more counters responsive to clock pulses applied thereto for dividing repetitive time frames into a predetermined number of time slots and for dividing each time slot into a given number of sub-slots, and various conventional logic circuitry coupled to the counters for generating various timing pulse signals, which will be discussed more in detail below, in accordance with the registered count manifested thereby.

FIG. 1 further shows a recirculation loop consisting of recirculation loop control 104 which receives information from and is controlled by system control 102 over a connection illustratively shown as connection 106, although in practice connection 106 would involve a plurality of conductors. Information from the recirculation loop is sent back to system control 102 over connection 108, which also in practice would involve a plurality of conductors.

Recirculation loop control 104 includes reclocking gates as well as gates for selectively applying information received from system control 102, over connection 106, to conductors 110*a*–110*d*, or information received from conductors 112*a*–112*d* to conductors 110*a*–110*d*. The information on each of conductors 110*a*–110*d*, after amplification by amplifiers 114*a*–114*d*, is applied, respectively, as an input to each of normally disabled AND gates 116*a*–116*d*. In a manner to be described more in detail below, AND gates 116*a*–116*d* are simultaneously enabled by a pulse on conductor 118 which occurs at a given time $t_{\text{inp}}$. The information then present at the input of AND gate 116*a*, after being delayed by each of delay means 120*a*, 120*b* and 120*c*, is applied as an input to main delay line 122. In a similar manner, the information then present at the input of AND gate 116*b*, after being delayed by each of delay means 120*b* and 120*c*, is applied as an input to main delay line 122; the information then present at the input of AND gate 116*c*, after being delayed solely by delay means 120*c*, is applied as an input to main delay line 122; and the information then present at AND gate 116*d* is applied, without any delay, directly as an input to main delay line 122. Delay means 120*a*, 120*b* and 120*c* may be individual delay lines each having the same given delay, or may be a single tapped delay line having a delay equal to the sum of the delays of delay means 120*a*, 120*b* and 120*c*.

The information present at the output of main delay line 122, after delay solely by delay means 124*a*, is applied as an input to normally disabled AND gate 126*a*. In a similar manner, the information present at the output of main delay line 122, after being delayed by both delay means 124*a* and 124*b*, is applied as an input to normally disabled AND gate 126*b*; the information present at the output of main delay line 122, after being delayed by each of delay means 124*a*, 124*b* and 124*c*, is applied as an input to normally disabled AND gate 126*c*; and the information present at the output of main delay line 122, after being delayed by each of delay means 124*a*, 124*b*, 124*c* and 124*d*, is applied as an input to normally disabled AND gate 126*d*. Delay means 124*a*, 124*b*, 124*c* and 124*d* may be individual delay lines each having the same given delay, or may be a single tapped delay line having a delay equal to the sum of the delays of delay means 124*a*, 124*b*, 124*c* and 124*d*.

AND gates 126*a*–126*d* are simultaneously enabled by a pulse on conductor 128 which occurs at a given time $t_{\text{out}}$. In accordance with the information then present at the respective inputs of each of AND gates 126*a*–126*d*, the corresponding one of bistable devices 130*a*–130*d* will be selectively switched to either a set or a reset condition thereof. The information on each of conductors 112*a*–112*d* will then reflect the information manifested by the condition of that one of the bistable devices 130*a*–130*d* corresponding thereto.

Comparison circuit 132, which is the heart of the present invention, comprises three input AND gate 134, three input AND gate 136, OR gate 138, bistable device 140, four input AND gate 142, four input AND gate 144, OR gate 146, inverter 148, inverter 150, capacitance 152 and resistance 154. As shown, the output of main delay line 122 is directly applied as a first input to three input AND gate 134 and four input AND gate 142, and is applied through inverter 150 as a first input to three input AND gate 136 and four input AND gate 144. The output of delay means 124*d* is directly applied as a second input to three input AND gate 136 and four input AND gate 142, and is applied through inverter 148 as a second input to three input AND gate 134 and four input AND gate 144. A timing signal from system control 102, which appears on conductor 156, is applied as a third input to each of three input AND gates 134 and 136. The output of either three input AND gate 134 or three input AND gate 136 is applied through OR gate 138 as a set input to bistable device 140. The reset output of bistable device 140 is applied as a third input to each of four input AND gates 142 and 144. A timing signal from system control 102, which appears on conductor 158, is applied as a fourth input to each of four input AND gates 142 and 144. The timing signal which appears on conductor 158 is also applied through the differentiating circuit formed by capacitance 152 and resistance 154 as a reset input to bistable device 140. The output of four input AND gate 142 or the output of four input AND gate 144, after passing through OR gate 146, constitutes the output of comparison circuit 132.

Bistable device 160, resistance 162, capacitance 164 and AND gate 166 in practice constitute part of system control 102. However, for the sake of clarity in describing the present invention they have been shown separately. The output of comparison circuit 132 is applied as a set input to bistable device 160. The set output of bistable device 160 is applied as a first input to AND gate 166. A timing signal from system control 102, which appears on conductor 168, is applied as a second input to AND gate 166, and is also applied through the differentiating circuit formed by resistance 162 and capacitance 164 as a reset input to bistable device 160.

Considering now the operation of the present invention, reference will be made to both FIGS. 1 and 2. FIG. 2 is a timing chart of a typical time frame showing the relative time of occurrence of various signals with respect to the output of main delay line 122.

Broadly speaking, information in the present invention occurs during repetitive time frames; each time frame is broken down into a predetermined number of successive words or time sets. Each word or time set consists of three successive characters or time slots. Each character or time slot is composed of a given number of successive binary bits or sub-slots. Purely for illustrative purposes, it is assumed that each character is composed of four binary bits. However, in practice, each character may be composed of many more than four binary bits. Actually, as will become apparent, the greater the number of binary bits composing a character, the more advantageous the present invention becomes.

Graph A of the timing chart shown in FIG. 2 shows the duration of the time interval *t* occupied by each subslot of a time frame during which a single binary bit occurs.

Graph B of the timing chart shown in FIG. 2 shows a time frame divided into *n* successive words or time sets (only the first and last words of which are shown), each word consisting of a first four-bit character, followed by a predetermined four-bit character, followed by a second four-bit character. For illustrative purposes, it is assumed that the predetermined character, which is the same for all words, has the value 6, the first character of the first word has the value 5, the second character of the first word has the value 7, the first character of word *n* has the value 6 and the second character of word *n* has the value 3.

Graph C of the timing chart shown in FIG. 2 shows these characters in conventional binary form. Thus, the character 5, manifested by the first character of the first word, consists of a mark pulse in solely the first and third bit positions of that character; the first character of the *n*th word as well as the predetermined character in both the first and the *n*th word, which all have the value 6, are each manifested by a mark pulse in solely the second and third bit positions of the corresponding character; the second character of the first word, which manifests a 7, consists of a mark pulse solely in the first, second and third bit positions of that character; and the second character of the *n*th word, which manifests a 3, consists of mark pulses solely in the first and second bit positions of that character. Thus it will be seen that each time frame consists of a single serial stream of successive sub-slots each containing a binary bit, wherein a binary "one" is manifested by a mark pulse within that sub-slot and a binary "zero" is manifested by the absence of a mark pulse within that sub-slot.

The bits forming any character may be entered in parallel into recirculation loop control 104 from system control 102 over connection 106, during the time interval of the time frame to be occupied by that character. Recirculation loop control 104 will then apply the respective bits forming a character to be entered into the recirculation loop simultaneously to each of conductors 110*a*–110*d*. More particularly, the first bit of the character will be applied to the conductor 110*d*, the second bit of the character will be applied to conductor 110*c*, the third bit of the character will be applied to conductor 110*b*, and the fourth bit of the character will be applied to conductor 110*a*.

Graph $t_{imp}$ of the timing chart shown in FIG. 2 shows that AND gates 116*a*–116*d* are simultaneously enabled during only a single bit of each successive character. During this period, the information on conductors 110*a*–110*d* is simultaneously sampled, and the first bit present on conductor 110*d* is applied directly to the input of the main delay line 122. Each of delay means 120*a*, 120*b* and 120*c* provides a delay equal to *t*, one sub-slot period, shown in graph A of the timing chart of FIG. 2. Therefore, the second bit of the character, which is present on conductor 110*c*, is applied to the input of main delay line 122 after a delay of one sub-slot period; and, in a similar manner, the third bit present on conductor 110*b* is applied to the input of main delay line 122 after a delay of two sub-slot periods; and the fourth bit present on conductor 110*a* is applied to the input of main delay line 122 after a delay of three sub-slot periods. In this manner, delay means 120*a*, 120*b* and 120*c* serve to convert the character from parallel form to serial form for its passage through main delay line 122.

One time frame later, as the bits composing any character successively arrive at the output of main delay line 122, they are successively applied as an input to delay means 124*a*. Each of delay means 124*a*, 124*b*, 124*c* and 124*d* provides a delay equal to *t*, one sub-slot period, shown in graph A of the timing chart of FIG. 2. Thus, for each character interval there will be a particular sub-slot period during which the first bit of a character will be emerging from delay means 124*d*, while the second bit of that character will be emerging from delay means 124*c*, the third bit of that character will be emerging from delay means 124*b*, the fourth bit of that character will be emerging from delay means 124*a*, and the first bit of the next following character will be emerging from the output of main delay line 122. During this particular sub-slot period of each character interval, AND gates 126*a*–126*d* are simultaneously opened, as shown in graph $t_{out}$ of the timing chart shown in FIG. 2. This results in bistable devices 130*a*–130*d* being set to statically store and present on conductors 112*a*–112*d* for a character interval the value of a character applied thereto from AND gates 126*a*–126*d*. Recirculation loop control 104, in accordance with instructions received from system control 102 over connection 106, may read out the value of the character presented on conductors 112*a*–112*d* over connection 108 and/or recirculate the information manifested by this character by applying the information present on conductors 112*a*–112*d* to conductors 110*a*–110*d*, respectively. Thus, in the manner described, information once inserted into the recirculation loop may be stored therein for as many time frames as desired. Erasure of any character may be easily accomplished by recirculation loop control 104 in accordance with instructions received from system control 102 over connection 106 by merely breaking the recirculation loop for a character interval, so that the information presented on conductors 112*a*–112*d* is then not applied to conductors 110*a*–110*d*, respectively.

Considering now the operation of comparison circuit 132, it will be seen that the presence of delay means 124*a*, 124*b*, 124*c* and 124*d*, connected in series as shown, will cause corresponding bits of two successive characters to be simultaneously present at the output of delay means 124*d* and at the output of main delay line 122, respectively. Thus, when the first bit of a given character is emerging from delay means 124*d*, the first bit of the character next succeeding this given character will be simultaneously emerging from main delay line 122. In a similar manner, when the second bit of a given character is emerging from delay means 124*d*, the second bit of the character next succeeding this given character will be simultaneously emerging from main delay line 122, et cetera.

Comparison circuit 132 provides means for comparing each pair of corresponding bits of successive characters in a particular manner which will now be discussed.

AND gates 134 and 136 and OR gate 138 make up a first binary logic means for producing an output when enabled in response to either a binary "one" being manifested by the output then emerging from delay means 124*d* and a binary "zero" being manifested by the output then emerging from main delay line 122, or a binary "zero" being manifested by the output then emerging from the output of delay means 124*d* and a binary "one" being manifested by the output then emerging from main delay line 122.

AND gates 142 and 144 and OR gate 146 make up a second binary logic means for producing an output when enabled in response to either a binary "one" being manifested by the output then emerging from delay means 124*d* and a binary "one" being manifested by the output then emerging from main delay line 122, or a binary "zero" being manifested by the output then emerging from the output of delay means 124*d* and a binary "zero" being manifested by the output then emerging from main delay line 122.

The first binary logic means comprising AND gates 134 and 136 is enabled in response to the timing signal applied thereto from system control 102 over conductor 156. The timing signal appearing on conductor 156 may have the waveform $t_1$, or, alternatively, under special conditions discussed below, may have the waveform $t_1'$, both of which are shown in the timing chart of FIG. 2.

Considering the waveform $t_1$, it will be seen that the first binary logic means comprising AND gates 134 and 136 will be disabled for the time interval during which all the bits comprising the first character of each word are emerging from main delay line 122, and then will be enabled for the time interval during which all the bits except the last bit composing each predetermined character and each second character of each ward is emerging from main delay line 122.

Thus, in the assumed case where each character is composed of four bits, shown in graph B of FIG. 2, the first binary logic means composed of AND gates 134 and 136 will be effective in successively comparing bit $L_1$ with bit $T_1$, $L_2$ with $T_2$, and $L_4$ with $T_4$, and then later comparing $C_1$ with $L_1$, $C_2$ with $L_2$, and $C_4$ with $L_4$. If any of these comparisons produce an output from the first binary logic means composed of AND gates 134 and 136, bistable device 140 will be switched to its set condition. Of course, if none of these comparisons produces an output from the first binary logic means comprising AND gates 134 and 136, bistable device 140 will remain in its reset condition.

The second binary logic means comprising AND gates 142 and 144 is enabled in response to the timing signal applied thereto from system control 102 over conductor 158, only if bistable device 140 is in its reset condition. More particularly, the timing signal appearing on conductor 158, which has the waveform $t_2$ shown in the timing chart of FIG. 2, partially enables the second binary logic means including AND gates 142 and 144 only for the respective intervals during which the last bit of the predetermined character and the second character of each word is emerging from the output of main delay line 122. Second binary logic means including AND gates 142 and 144 will be totally enabled only if bistable device 140 is in its reset condition during these respective intervals during which AND gates 142 and 144 are partially enabled by timing signal $t_2$.

From the foregoing discussion, it will be seen that bistable device 140 will be in its reset condition during the time the last bit of the predetermined character is emerging from main delay line 122 only if bistable device 140 has not previously been set, i.e., only if there has been identity between each pair of corresponding bits of the first character and the predetermined character which precede the last pair of bits thereof. If this in fact has been the case, AND gates 142 and 144 will be enabled for the time interval during which the last bit of the predetermined character is emerging from main delay line 122, and this last bit of the predetermined character will be compared with the last bit of the first character by the second binary logic means including AND gates 142 and 144. If this last pair of bits turns out to be identical, then, and only then, will the second binary logic means including AND gates 142 and 144 produce an output. This output from the second binary logic means is indicative of the fact that the first character and the predetermined character are identical.

Timing signal $t_2$ is differentiated by the differentiating circuit formed by capacitance 152 and resistance 154 and then applied as a reset input to bistable device 140. Bistable device 140 is constructed to be reset in response to the lagging edge of each negative pulse included in timing signal $t_2$. Therefore, even if bistable device 140 has been switched to a set condition in the process of comparing bits of a first character with corresponding bits of the predetermined character, it will have been switched back to a reset condition by the time the first bit of the second character of a word is emerging from the output of main delay line 122. Therefore, bistable device 140, in the same manner as described above, will be in a position to be set by any corresponding pair of bits preceding the last pair of bits of the second character and predetermined character of each word manifesting a lack of identity. The second binary logic means including AND gates 142 and 144, in the same manner as described above, will be in a position to compare the last pair of bits of the second character and predetermined character of each word, and produce an output therefrom only if the second character is identical to the predetermined character. Also, bistable device 140 will be reset at the end of the time interval during which the last bit of the second character of each word emerges from the main delay line 122.

Generalizing from the above explanation of the operation of comparison circuit 132, it will be seen that the first binary logic means including AND gates 134 and 136 is effective in comparing the first occurring (N−1) corresponding bits of a pair of N bit characters; while the second binary logic means including AND gates 142 and 144 is effective in comparing the *n*th or last occurring pair of bits of the pair of characters being compared.

Since the first binary logic means including AND gates 134 and 136 and the second binary logic means including AND gates 142 and 144 produce respective outputs which are mutually exclusive from each other, even if the first binary logic means including AND gates 134 and 136 were to be enabled during the comparison of the last pair of bits of two characters being compared by the second binary logic means including AND gates 142 and 144, no detrimental effect on the operation of comparison circuit 132 would take place. However, it is essential that bistable device 140 be reset at the termination of the comparison of the *n*th pair of bits of two characters being compared, even if a set input is being simultaneously applied to bistable device 140. Since it is well known in the art to construct bistable devices wherein a reset input will override a simultaneously applied set input, if bistable device 140 is of such a type, the timing signal appearing on conductor 156 may have the relatively simple waveform $t_1'$, rather than $t_1$, shown in the timing chart of FIG. 2.

Bistable device 160 is set in response to any output from the second binary logic means including AND gates 142 and 144, and, if set, remains set until a time subsequent to the comparison of the characters of the last word *n* in a time frame, at which time the condition of bistable device 160 is read out to system control 102 by enabling AND gate 166 in response to timing signal $t_3$ appearing on conductor 168. For instance, timing signal $t_3$ may have the waveform shown in the timing chart of FIG. 2, where a negative pulse occurring during the first bit of the first character of the first word of any given time frame is effective in controlling the reading out of the condition that bistable device 160 assumed during the time frame which immediately preceded the given time frame.

The pulse included in timing signal $t_3$ is differentiated by the differentiating circuit formed by resistance 162 and capacitance 164, and then applied as a reset input to bistable device 160, which is reset in response to the lagging edge of this pulse.

Consider now the example shown in FIG. 2. The predetermined character of each and every word in the time frame there shown has the value 6. The first character of the first word is a 5. The second character of the first word is a 7. The first character of the last word *n* is a 6, and the second character of the last word is a 3.

In the light of the above description of the application of applicant's invention, it will be seen that graph 138 of the timing chart shown in FIG. 2 manifests the output of OR gate 138 of the first binary logic means, since the value of the bits $L_1$ and $L_2$ of the predetermined character of the first word is different from the value of the bits $T_1$ and $T_2$ of the first character of the first word; the value of the bit $C_1$ of the second character of the first word is different from the value of the bit $L_1$ of the predetermined character of the first word; and the value of the bits $C_1$ and $C_4$ of the second character of word *n* is different from the value of the bits $L_1$ and $L_2$ of the predetermined character of word *n*. Therefore, graph 140 of FIG. 2 will represent the reset output condition of bistable device 140.

Since the only compared pair of characters which are identical are the first and predetermined characters of word *n*, which are both 6, graph 146 of the timing chart shown in FIG. 2, which manifests the output of OR gate 146 of the secondary binary logic means, shows a single pulse occurring at the time the bit $L_8$ of the predetermined character of word *n* is emerging from main delay line 122. Graph 160 of the timing chart shown in FIG. 2, which manifests the set output condition of bistable device 160, shows that bistable device 160 is switched to its set condition in response to the pulse shown in graph 146 and then remains in this condition for the rest of the time frame. Bistable device 160 will be reset in response to the occurrence of the lagging edge of the timing signal $t_3$ of the next subsequent time frame (not shown).

It will be seen that if in all the words of a time frame the predetermined character were different from each and every one of the first characters of all the words thereof and were different from each and every one of the second character of all the words thereof, bistable device 160 would remain in its reset condition, so that when it was interrogated in response to the next subsequent pulse of timing signal $t_3$, this fact will be made known to system control 102.

Although only a preferred embodiment of the invention has been described herein, it is not intended that the invention be restricted thereto but that it be limited only to the true spirit and scope of the appended claims.

What is claimed is:

1. A common series double comparison circuit comprising a binary bit source for producing at a predetermined bit rate a single serial stream of individual binary bits each of which bits manifests exclusively either a binary one or a binary zero, said stream comprising at least one time set each of which consists of 3N consecutive bits, N being a plural integer, wherein the first-occurring N consecutive bits of each time set manifests a first character thereof, the second-occurring N consecutive bits of each time set manifests a predetermined character thereof and the third-occurring N consecutive bits of each time set manifests a second character thereof; and a common series comparison circuit coupled to said source and responsive to the output therefrom for comparing said predetermined character with each of said first and second characters bit by bit including means for producing an output signal in response to either said first or second characters being identical to said predetermined character, a delay means for reproducing at its output a bit applied to its input after a time delay equal to N bit periods, means for applying the output of said source to the input of said delay means, said comparison circuit comprising controlled first binary logic means for producing an output when enabled solely in response to either a bit manifesting a binary one being applied to a first input thereof and a bit manifesting a zero being simultaneously applied to a second input thereof or a bit manifesting a binary zero being applied to said first input thereof and a bit manifesting a binary one being simultaneously applied to said second input thereof, a bistable switch having a set condition and a reset condition, means for applying the output of said first binary logic means to said bistable switch to effect the switching thereof from a reset condition to a set condition in response thereto, controlled second binary logic means coupled to said bistable switch for producing an output when enabled solely in response to said switch being in its reset condition and either a bit manifesting a binary one being applied to a first input thereof and a bit manifesting a binary one being simultaneously applied to a second input thereof or a bit manifesting a binary zero being applied to said first input thereof and a bit manifesting a binary zero being simultaneously applied to said second input thereof, means for simultaneously applying the binary bits appearing at the input of said delay means as said first input to both said first and second binary logic means and the binary bits appearing at the output of said delay means as said second input to both said first and second binary logic means, system control means including first control means for disabling said first binary logic means during the time interval of said time set in which all bits of said first character are being applied to the first input thereof and for enabling said first binary logic means at least during the respective time intervals of said time set in which the first (N–1) bits of said predetermined character and the first (N–1) bits of said second character are being applied to the first input thereof, and second control means for both effecting the switching of said bistable switch from a set condition thereof to a reset condition thereof and for enabling said second binary logic means only during the respective time intervals of said time set that said Nth bit of said predetermined and second characters are being applied to the first input thereof, whereby an output from said second binary logic means comprises said comparison circuit output signal.

2. The combination defined in claim 1, wherein said bistable switch is of the type in which the simultaneous application of set and reset signals thereto results in said switch being switched to a reset condition thereof, and wherein said first control means enables said first binary logic means during the time interval of said time set that all bits of said predetermined character and said second character are being applied to the first input thereof.

3. The combination defined in claim 1, further including a second bistable switch having a set condition and a reset condition, and means for applying said output signal to said second bistable switch to effect the switching thereof from its reset condition to its set condition in response to the occurrence of said output signal to thereby store the fact that said output signal has occurred.

4. The combination defined in claim 3, wherein said binary bit source produces a stream comprising a given plurality of successive time sets, the first character of said respective time sets being different from each other, the predetermined character of said respective time sets being the same as each other and the second character of said respective time sets being different from each other, utilization means, and third control means coupled to said second bistable switch and said utilization means for selectively operating said utilization means after the end of said stream in accordance with the then existing condition of said second bistable switch and subsequent thereto effecting the switching of said second bistable switch from a set condition thereof to a reset condition thereof.

5. A common series double comparison circuit comprising a binary bit source supplying on a single line a serial stream of binary bits comprising consecutive words, each word consisting of at least two bit characters, the second one of said characters in each word consisting of a predetermined combination of binary bits, and a common series comparison circuit coupled to said single line of said binary bit source and responsive to the output therefrom for comparing bit by bit said second character having said predetermined combination of binary bits with the immediately adjacent bit characters of said word including means for producing an output signal only in response to each identical correspondence between said second character and another character of the same word.

6. The combination defined in claim 5 including delay means connected in said single line to said bit source and said comparison circuit for delaying bits applied thereto by a time period occupied by a bit character, said comparison circuit further including binary logic means connected to both the input and output of said delay means for comparing bits appearing simultaneously at said input and output of said delay means.

7. The combination defined in claim 6 wherein said binary logic means including first binary circuit means establishing a first signal in response to lack of bit by bit correspondence between any but the last bit of consecutive characters of a common word, and second binary circuit means for producing said output signal in response to detection of correspondence between the last bit of consecutive characters of a common word and lack of said first signal generated by said first binary circuit in connection with the same consecutive characters.

8. The combination defined in claim 7 wherein each word consists of three bit characters.

References Cited

UNITED STATES PATENTS

| | | | |
|---|---|---|---|
| 3,167,740 | 1/1965 | King et al. | 340—146.2 |
| 3,183,484 | 5/1965 | Christiansen et al. | 340—146.2 |

MALCOLM A. MORRISON, *Primary Examiner.*

M. SPIVAK, *Assistant Examiner.*